(12) United States Patent
Asthana et al.

(10) Patent No.: US 12,088,649 B2
(45) Date of Patent: Sep. 10, 2024

(54) ADAPTIVE CONTENT MASKING DURING WEB CONFERENCING MEETINGS

(71) Applicant: International Business Machines Corporation, Armonk, NY (US)

(72) Inventors: Avinash Asthana, London (GB); Shikhar Kwatra, San Jose, CA (US); Diwesh Pandey, Bengaluru (IN); Tathagato Bose, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 17/445,546

(22) Filed: Aug. 20, 2021

(65) Prior Publication Data

US 2023/0059019 A1 Feb. 23, 2023

(51) Int. Cl.
*H04L 29/06* (2006.01)
*G06N 3/02* (2006.01)
(Continued)

(52) U.S. Cl.
CPC ........... *H04L 65/4038* (2013.01); *G06N 3/02* (2013.01); *G06N 5/02* (2013.01); *H04L 63/101* (2013.01);
(Continued)

(58) Field of Classification Search
CPC .... G06F 3/1454; G06F 16/9535; G06F 21/62; G06F 40/166; G06F 40/40;
(Continued)

(56) References Cited

U.S. PATENT DOCUMENTS 9,191,615 B1 * 11/2015 Valimaki ............... H04L 51/046
10,171,524 B2    1/2019 Privat
(Continued)

FOREIGN PATENT DOCUMENTS

CN         101192943 B         2/2011

OTHER PUBLICATIONS

Anonymous, "Method for Easing the Sharing of Document with Sensitive Content in a Video Conference," An IP.com Prior Art Database Technical Disclosure, IPCOM000261292D, Feb. 18, 2020, 4 pages.
(Continued)

*Primary Examiner* — Dustin Nguyen
(74) *Attorney, Agent, or Firm* — Yee & Associates, P.C.

(57) ABSTRACT

Adaptive content masking is provided. Content visibility customizations are applied to a view of shared information by respective participants during screen sharing in a web conferencing meeting using content visibility control settings. Content visibility is adjusted via adaptive learning based on frequency and type of screen sharing previously completed between a content presenter and respective participants of the web conferencing meeting. Content masking is applied adaptively based on monitoring the shared information and correlating the shared information with respective participants by retrieving meeting information prior to the web conferencing meeting and retrieving screen capture attributes from metadata of the web conferencing meeting that are mapped to the shared information being displayed on screens corresponding to respective participants.

20 Claims, 8 Drawing Sheets

(51) Int. Cl.
*G06N 5/02* (2023.01)
*H04L 9/40* (2022.01)
*H04L 65/401* (2022.01)
*H04L 65/4038* (2022.01)

(52) U.S. Cl.
CPC .......... *H04L 63/102* (2013.01); *H04L 63/104* (2013.01); *H04L 65/4015* (2013.01)

(58) Field of Classification Search
CPC ..... G06F 16/3331; G06F 9/451; H04N 1/488; H04N 5/272; H04N 7/15; H04L 12/1827; H04L 63/083; H04L 63/105; H04L 51/04; H04L 51/046; H04L 12/1822; H04L 63/20; H04L 67/06; H04W 12/086; H04W 12/088; H04W 12/02; H04M 3/5191; G06Q 10/107
See application file for complete search history.

(56) References Cited

U.S. PATENT DOCUMENTS

| | | | | |
|---|---|---|---|---|
| 10,523,613 | B1* | 12/2019 | Alm | G06Q 10/107 |
| 10,650,121 | B1* | 5/2020 | Wei | G06F 40/166 |
| 10,956,609 | B2 | 3/2021 | Kochura et al. | |
| 11,082,661 | B1* | 8/2021 | Pollefeys | H04N 7/15 |
| 11,165,755 | B1* | 11/2021 | Qian | H04N 5/272 |
| 2011/0004888 | A1 | 1/2011 | Srinivasan et al. | |
| 2011/0161445 | A1* | 6/2011 | Nelke | H04L 51/04 |
| | | | | 709/206 |
| 2012/0089928 | A1* | 4/2012 | Bryant | H04L 12/1827 |
| | | | | 715/753 |
| 2012/0133727 | A1 | 5/2012 | Bolduc et al. | |
| 2012/0306992 | A1* | 12/2012 | Watson | H04N 7/15 |
| | | | | 348/E7.083 |
| 2013/0007895 | A1* | 1/2013 | Brolley | G06F 21/62 |
| | | | | 726/28 |
| 2013/0019186 | A1* | 1/2013 | Lance | H04L 12/1827 |
| | | | | 715/753 |
| 2013/0136253 | A1* | 5/2013 | Liberman Ben-Ami | |
| | | | | H04M 3/5191 |
| | | | | 379/265.09 |
| 2014/0195626 | A1* | 7/2014 | Ruff | H04W 12/088 |
| | | | | 709/206 |
| 2014/0317532 | A1 | 10/2014 | Ma et al. | |
| 2015/0244682 | A1* | 8/2015 | Biswas | H04L 63/083 |
| | | | | 726/26 |
| 2016/0321469 | A1* | 11/2016 | Bhogal | G06F 16/3331 |
| 2017/0024100 | A1* | 1/2017 | Pieper | G06F 40/40 |
| 2017/0139659 | A1* | 5/2017 | Spriggs | G06F 9/451 |
| 2018/0302233 | A1* | 10/2018 | Viera | H04L 12/1822 |
| 2019/0073490 | A1* | 3/2019 | Agrawal | G06F 3/1454 |
| 2020/0019716 | A1* | 1/2020 | Leonard | H04L 63/105 |
| 2020/0257746 | A1* | 8/2020 | Gibbon | G06F 16/9535 |
| 2021/0099488 | A1* | 4/2021 | Schrager | H04L 63/20 |
| 2022/0060661 | A1* | 2/2022 | Truong | H04W 12/02 |
| 2022/0103566 | A1* | 3/2022 | Faulkner | H04L 67/06 |
| 2022/0247887 | A1* | 8/2022 | Sharma | H04N 1/448 |

OTHER PUBLICATIONS

Anonymous, "Role-Based Mapping Rules Blur All or Parts of Shared Content Based on Cognitive Analysis," An IP.com Prior Art Database Technical Disclosure, IPCOM000262057D, Apr. 28, 2020, 3 pages.

* cited by examiner

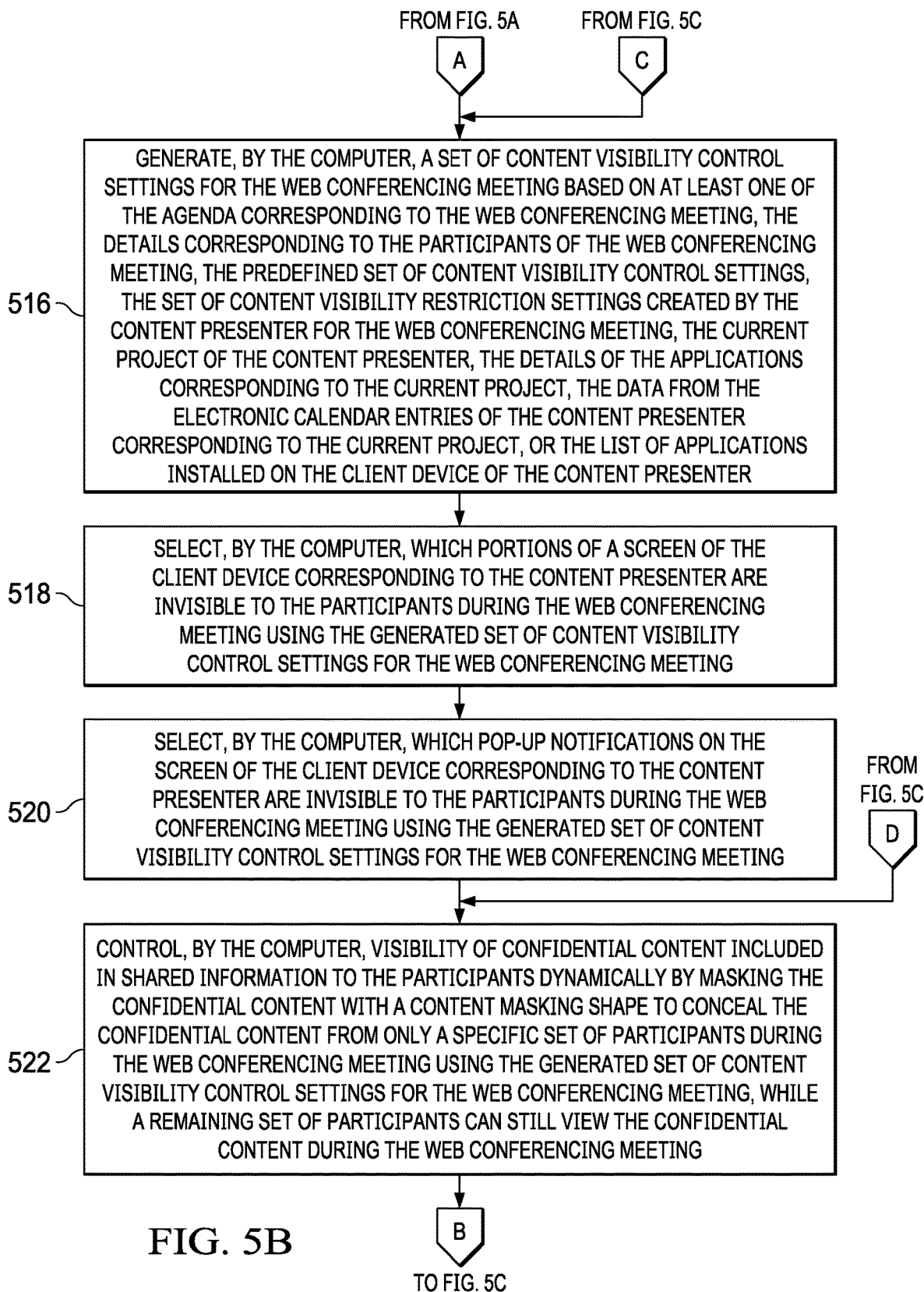

ADAPTIVE CONTENT MASKING DURING
WEB CONFERENCING MEETINGS

BACKGROUND

1. Field

The disclosure relates generally to web conferencing and more specifically to dynamic masking of confidential content contained within shared information over the course of a web conferencing meeting depending on who is presenting the shared information and who is viewing the shared information using content visibility control settings and adaptive learning.

2. Description of the Related Art

Web conferencing is used for various types of online sessions and collaborative services, such as, for example, web meetings, webinars, webcasts, and the like. In general, web conferencing is made possible via Internet technologies, particularly on TCP/IP connections. Web conferencing can allow real time point-to-point communications as well as multicast communications from one sender to many receivers. Web conferencing offers data streams of text, voice, and video to be shared simultaneously across geographically dispersed locations.

Applications of web conferencing can include business meetings, training events, lectures, or presentations from one web-connected computer to other web-connected computers. Web conferencing software is invoked by all participants of a web conferencing meeting. Typically, presentation of visual content is accomplished via the web conferencing software showing participants an image of content on the presenter's computer screen.

SUMMARY

According to one illustrative embodiment, a computer-implemented method for adaptive content masking is provided. A computer applies content visibility customizations to a view of shared information by respective participants during screen sharing in a web conferencing meeting using content visibility control settings. The computer adjusts content visibility via adaptive learning based on frequency and type of screen sharing previously completed between a content presenter and respective participants of the web conferencing meeting. The computer applies content masking adaptively based on monitoring the shared information and correlating the shared information with respective participants by retrieving meeting information prior to the web conferencing meeting and retrieving screen capture attributes from metadata of the web conferencing meeting that are mapped to the shared information being displayed on screens corresponding to respective participants. According to other illustrative embodiments, a computer system and computer program product for adaptive content masking are provided.

BRIEF DESCRIPTION OF THE DRAWINGS

FIGS. 5A-5C are a flowchart illustrating a process for adaptive masking of confidential content contained within shared information during a web conferencing meeting in accordance with an illustrative embodiment.

DETAILED DESCRIPTION

Figure 1:
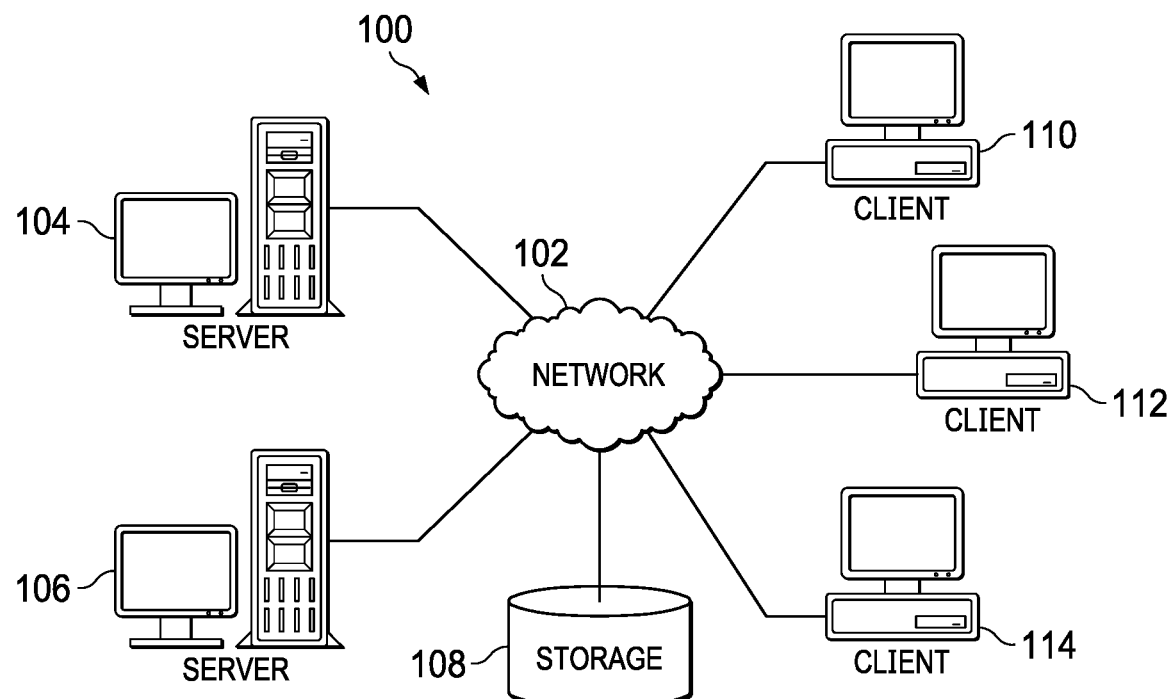
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
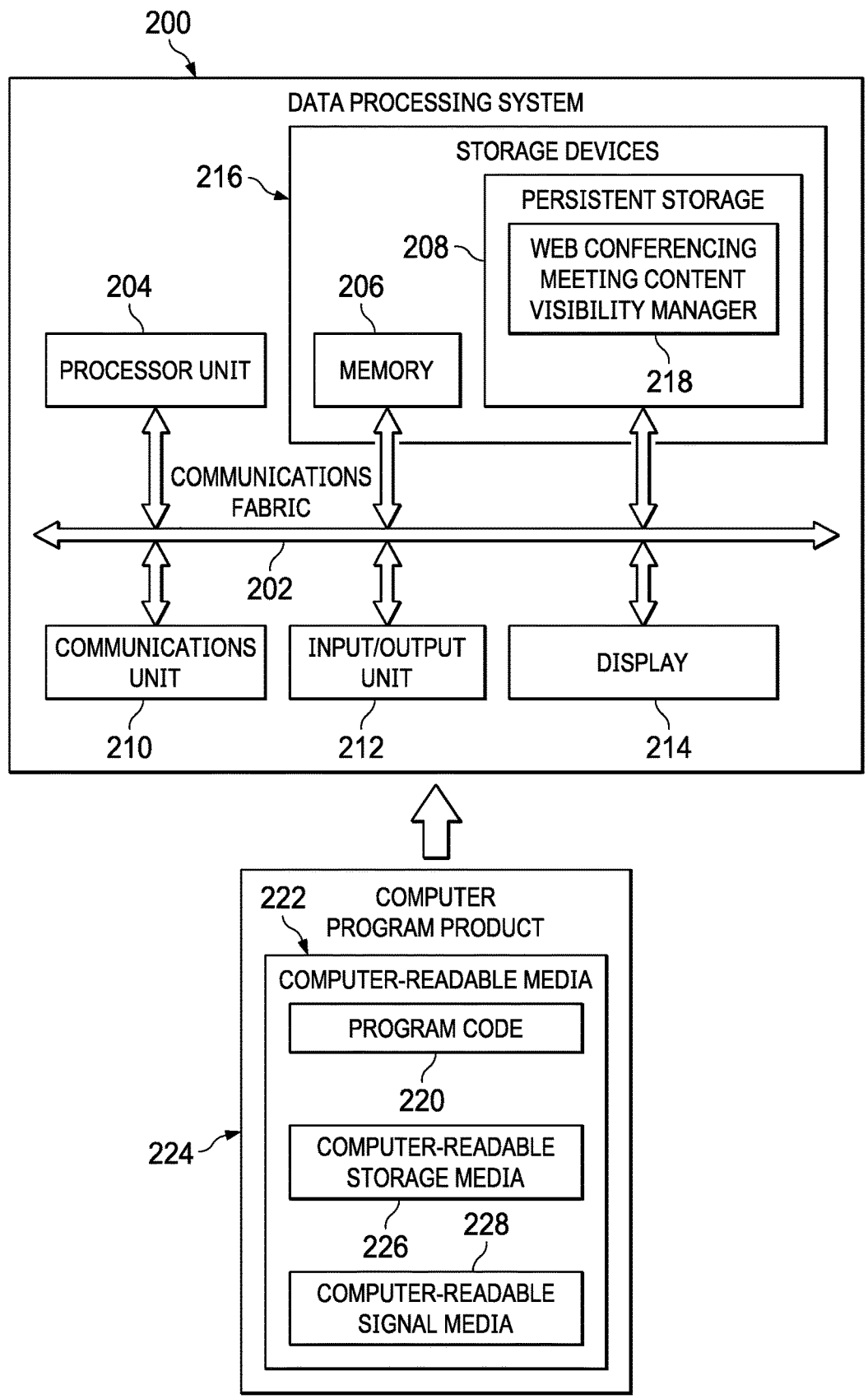
FIG. 2 is a diagram of a data processing system in which illustrative embodiments may be implemented.
Figure 3:
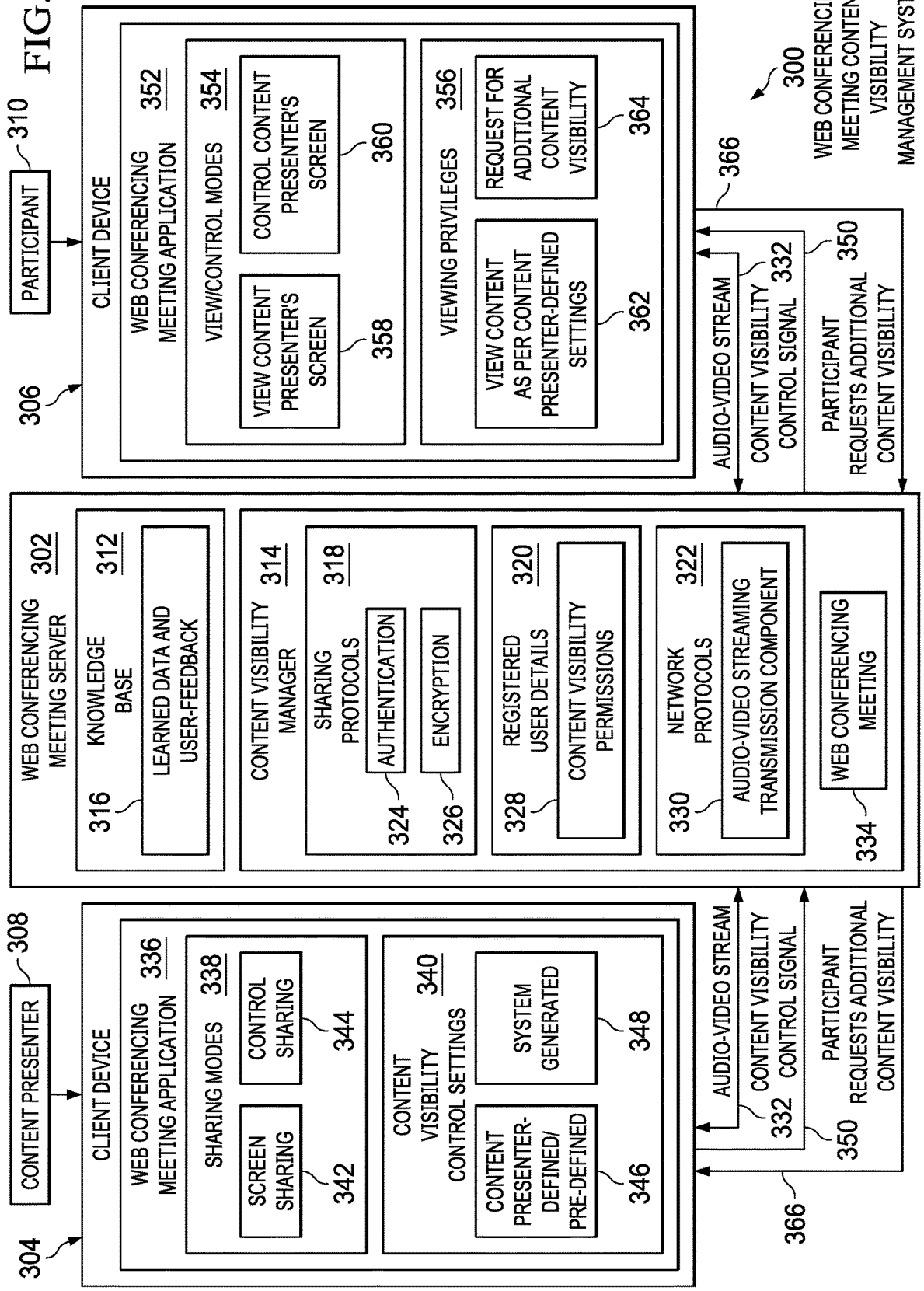
FIG. 3 is a diagram illustrating an example of a web conferencing meeting content visibility management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide web conferencing services and content visibility management services during web conferencing meetings. Server 104 and server 106 provide the content visibility management services by dynamically masking confidential content contained within shared information over the course of an entire web conferencing meeting depending on who is presenting the shared information and who is viewing the shared information using content visibility control settings and adaptive learning.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart watches, smart glasses, smart televisions, smart vehicles, and the like, with wire or wireless communication links to network 102. Users of clients 110, 112, and 114 may utilize clients 110, 112, and 114 to access and utilize the web conferencing and content visibility management services provided by server 104 and server 106. The client device users may be, for example, content presenters and participants (e.g., content viewers) of a web conferencing meeting.

Storage 108 is a network storage device capable of storing any type of data in a structured format or an unstructured format. In addition, storage 108 may represent a plurality of network storage devices. Further, storage 108 may store identifiers and network addresses for a plurality of servers, identifiers and network addresses for a plurality of client devices, client device profiles, identifiers for a plurality of client device users, client device user profiles, identifiers for a plurality of web conferencing meetings, historical content visibility control settings for a plurality of different types of web conferencing meetings, and the like. Furthermore, storage 108 may store other types of data, such as, for example, authentication or credential data that may include usernames, passwords, and the like associated with client device users.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the web conferencing meeting content visibility management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores web conferencing meeting content visibility manager 218. However, it should be noted that even though web conferencing meeting content visibility manager 218 is illustrated as residing in persistent storage 208, in an alternative illustrative embodiment, web conferencing meeting content visibility manager 218 may be a separate component of data processing system 200. For example, web conferencing meeting content visibility manager 218 may be a hardware component coupled to communication fabric 202 or a combination of hardware and software components. In another alternative illustrative embodiment, a first set of components of web conferencing meeting content visibility manager 218 may be located in data processing system 200 and a second set of components of web conferencing meeting content visibility manager 218 may be located in a second data processing system, such as, for example, server 106 or client 110 in FIG. 1.

Web conferencing meeting content visibility manager 218 controls the process of dynamically masking confidential content contained within shared information during a web conferencing meeting depending on who is presenting the shared information and who is viewing the shared information using content visibility control settings and adaptive learning. As a result, data processing system 200 operates as a special purpose computer system in which web conferencing meeting content visibility manager 218 in data processing system 200 enables security of confidential content included in shared information during a web conferencing meeting. In particular, web conferencing meeting content visibility manager 218 transforms data processing system 200 into a special purpose computer system as compared to currently available general computer systems that do not have web conferencing meeting content visibility manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Web conferencing meetings have become widely used as a business practice due to ease of accessibility and independence of physical proximity. Currently, users can access or utilize web conferencing applications from desktops, laptops, handheld computers, mobile devices, and the like. Using individual login identifiers, web conferencing applications can differentiate multiple users and enable specific privileges.

Enabled with multiple usability dimensions, web conferencing applications perform audio-video conferencing, screen sharing, control sharing, and the like among users. In the case of a digital presence of users in a web conferencing meeting, the users currently maintain visibility of applications and content manually. For example, a user, such as a content presenter, may wish to only share work-related content, such as, for example, a company's financial report, with others included in the web conferencing meeting and not non-work-related content on the user's screen. While performing screen sharing during the web conferencing meeting, the user may want to customize content viewing privileges depending on the presence of a specific person or set of persons in the web conferencing meeting. Similarly, in the case of multiple teams with different levels of involvement in the web conferencing meeting, the user may want to maintain content visibility of confidential content in multiple levels (e.g., one team in the web conferencing meeting may need to see a group chat regarding a particular topic during screen sharing, but for another team in that same web conferencing meeting that particular group chat may include confidential content that is not be shared with that other team). Further, if the web conferencing meeting is being recorded, the content presenter may not want to record specific portions of the screen showing confidential content (e.g., confidential text, document, image, picture, video, graphic, or the like). Currently, managing confidential content visibility is done manually by a presenter of that content.

Illustrative embodiments can automatically mask all confidential content to only show non-confidential content to one or more specific participants in a web conferencing meeting when, for example, a content presenter is conducting the meeting with external participants who are not a part of the content presenter's company. Additionally, illustrative embodiments can also automatically mask confidential details corresponding to the external participants in the meeting. Customizing confidential content masking based on a given set of participants in a web conferencing meeting ensures that illustrative embodiments will not mask non-confidential relevant information to that set of participants during the meeting. By taking into account a plurality of factors, such as, for example, a participant's prior meetings with the content presenter, current projects or work items that the participant is collaborating on with the content presenter, company organizational structure, and the like, illustrative embodiments can personalize the masking of confidential content for a given set of participants during a web conferencing meeting.

Illustrative embodiments add intelligence (e.g., content visibility control settings or rules) to web conferencing applications for preventing confidential content visibility of shared information to particular participants during a web conferencing meeting. By accessing relevant data with permission from a content presenter, illustrative embodiments generate a set of content visibility control settings, which illustrative embodiments apply to a varied set of information that is visible on a screen, while the content presenter is performing screen sharing during the web conferencing meeting. In addition to the content visibility control settings generated by illustrative embodiments, the content presenter can also create a set of content visibility restriction settings regarding confidential data or other content that the content presenter does not want to share with other participants during the web conferencing meeting. It should be noted that illustrative embodiments keep certain types of sensitive information, such as, for example, user identifiers, user passwords, phone numbers, credit card numbers, bank account numbers, browser history, recycle bin content, and the like, which are identified in predefined content visibility control settings, as confidential and will not share that information with any web conferencing meeting participant.

Further, illustrative embodiments can disable control accesses or viewing capabilities of specific participants during the web conferencing meeting. While performing control sharing, as per the privilege of a participant who is accessing control remotely, illustrative embodiments imply the privilege of that particular participant using the content visibility control settings. It should be noted that illustrative embodiments utilize a predefined set of content visibility control settings and also generate an additional set of content visibility control settings based on information provided to illustrative embodiments from multiple dimensions.

Illustrative embodiments dynamically add content masking shapes to on-screen shared information, which contains confidential content, based on monitoring the information being shared and correlating that shared information with meeting participants by retrieving meeting information from electronic calendar entries of participants prior to the meeting. The content masking shapes can include, for example, regular shapes such as circles, ovals, squares, rectangles, and the like and irregular shapes such as polygons, trapezoids, amorphous shapes, and the like. Illustrative embodiments map screen capture attributes, which illustrative embodiments retrieve from metadata corresponding to the meeting, to information being shared on-screen with meeting participants. Illustrative embodiments can also automatically transfer a set of applications displayed on a screen of a device corresponding to the content presenter to another screen, if available, or hide the set of applications for a time interval during the web conferencing meeting based on the content visibility control settings.

During the web conferencing meeting, illustrative embodiments track data from multiple dimensions with consent from the content presenter and generate the set of content visibility control settings. The multiple dimensions can include, for example, purpose of the web conferencing meeting, frequency and type of the web conferencing meeting (e.g., whether the meeting is held regularly such as daily, weekly, biweekly, monthly, or the like or irregularly such as only when needed), common content visibility control settings for that type of web conferencing meeting, and the like. The multiple dimensions can also include number and type of meeting participants (e.g., the type of meeting participants will be different in a management meeting versus a technical meeting). In addition, job roles corresponding to meeting participants is a dimension (e.g., a meeting participant in a senior position, such as a manager, will know internal company details on which a new hire will be completely unaware of). Another dimension is team preferences (e.g., illustrative embodiments can utilize different content visibility control settings during a meeting between core technical team members and extended team members where level of content confidentiality should be higher or increased for the extended team members). A further dimension is basic details regarding meeting participants (e.g., parameters such as company, role, security level, and the like corresponding to participants assist illustrative embodiments in generating more refined content visibility control settings). For example, illustrative embodiments may mask or make invisible confidential content to a set of meeting participants having a particular role with low-level security clearance in a company. A further dimension is information regarding the schedule of the content presenter (e.g., illustrative embodiments can track information such as electronic calendar entries, current projects, and time of day to generate content visibility control settings). For example, if illustrative embodiments determined that a particular topic discussed in a previous web conferencing meeting was sensitive or confidential and the content presenter has performed activities regarding that particular topic, then illustrative embodiments will track those activities. A further dimension is a list of applications installed on the content presenter's device (e.g., illustrative embodiments will consider audit data of a data auditing application as confidential data by default according to predefined content visibility settings).

Illustrative embodiments may utilize purpose of the web conferencing meeting to determine which content or portion of a screen is to be kept confidential and needs to be masked or made invisible to certain meeting participants. Purpose of the web conferencing meeting may include, for example, brain storming, affinity diagramming of ideas and data, project status reporting, data analysis, decision making, technical discussion, announcements, and the like. Illustrative embodiments further consider certain information as confidential by default, such as, for example, user identifiers, user passwords, phone numbers, credit card numbers, bank account numbers, browser history, recycle bin content, and the like. In addition, a user can also define certain data or information as confidential, which influences content visibility by other participants in the web conferencing meeting.

Additionally, illustrative embodiments enable content access control restrictions on top of the content visibility control settings during control sharing of a web conferencing meeting. For example, during control sharing (e.g., during an IT support session), illustrative embodiments maintain masking of confidential content during screen sharing. Further, illustrative embodiments can implement a set of functionality control settings, such as, for example, disable auto-login, disable access to content presenter's computer system and installed applications, disable access to content presenter's computer system storage, and the like.

Illustrative embodiments can also run a deep convolutional neural network, such as, for example, You Only Live Once (YOLO), version 3 or 4, to identify and capture confidential content shown on a screen of the content presenter at any given time during the web conferencing meeting. Illustrative embodiments extract screen capture attributes in the form of on-screen dimensions or coordinates of an open application and displayed information of the open application. Illustrative embodiments append the extracted screen capture attributes to the user's metadata information at a given time prior to sharing the information with other participants of the web conferencing meeting. Illustrative embodiments can store this information in a hashed dictionary format (e.g., {D: [x, y], A: [type]}, where "D" is the on-screen dimensions and "A" is the application). Illustrative embodiments map the screen capture attributes, which illustrative embodiments retrieved from metadata corresponding to the web conferencing meeting, to information being displayed and shared on-screen. Illustrative embodiments can automatically transfer one or more applications containing confidential content to another screen of the content presenter, if available, or hide the one or more applications for a time interval during the web conferencing meeting based on the content visibility control settings. Illustrative embodiments can also append meeting type to the hashed dictionary.

Moreover, when illustrative embodiments identify a mismatch in terms of similarity analysis bundled with information regarding application type and meeting type, illustrative embodiments record a negative correlation corresponding to the application and meeting type in a knowledgebase for adaptive learning and decision-making purposes by illustrative embodiments. In other words, illustrative embodiments learn, for example, that certain applications or content cannot be shown during certain meeting types. Illustrative embodiments can utilize a multi-label classifier to encapsulate those dimensions by either moving the application or content to an alternate screen by polling a port if an additional screen exists or by masking the application or content in that portion of the screen.

Illustrative embodiments can be embedded as an orchestration layer for any given web conferencing software. Once a web conferencing meeting starts, illustrative embodiments retrieve and analyze initial metadata regarding the topic to be discussed during the web conferencing meeting and participants of the meeting. In addition, illustrative embodiments also analyze prior meeting history between meeting participants, which include the content presenter and other meeting attendees. Illustrative embodiments can collect unstructured data from a client device of a meeting participant using, for example, a natural language understanding component for named entity recognition to fetch a participant's information. A participant's information may include, for example, electronic calendar information for time-based data. Using named entity recognition, illustrative embodiments can identify participants added to a web conferencing meeting, along with the participants' designations (e.g., company roles). Illustrative embodiments can also run a K-nearest neighbor classification algorithm on the identified participants and their associated profiles to identify the relationships between respective participants of the web conferencing meeting.

Thus, illustrative embodiments automatically identify confidential content for any given content presenter/content viewer mapping, which may change over time, before dynamically generating content masking shapes to obfuscate, conceal, or make invisible the confidential content to a specific set of participants (e.g., content viewers) during the web conferencing meeting. In other words, illustrative embodiments enable adaptive masking of confidential content over an entire course of the web conferencing meeting depending on who is presenting shared information and who is viewing the shared information. Furthermore, illustrative embodiments dynamically update access control settings based on interactions between the content presenter and a given participant in a given web conferencing meeting.

Illustrative embodiments dynamically generate a set of content masking shapes based on proactive monitoring of on-screen shared information, which includes confidential content, with meeting participants by a content presenter. Illustrative embodiments utilize adaptive learning and a plurality of factors to identify what data points (e.g., confidential content or other content specified by the content presenter) should be masked from certain participants during a web conferencing meeting. The plurality of factors includes, for example, interactions between the content presenter and a particular participant, changes in relationship between the content presenter and that particular participant over time based on meeting dynamics or changes in roles, and the like. Illustrative embodiments dynamically change confidential content masking during a live web conferencing meeting for any given web conferencing meeting participant in real time based on dynamics of the meeting.

In some illustrative embodiments, the content presenters and content viewers must opt into the system in order for the system to collect their information (e.g., calendar data, metadata, et cetera), and each user may determine which audience types (e.g., second users, et cetera) can view or share their data. For example, during an initialization process, the system may inform a user of the types of data that it will collect (e.g., calendar data, et cetera) and the reasons why the data is being collected. In these embodiments, the system will only start collecting the user information upon the user explicitly permitting the collection. Furthermore, the system may only collect the data that is necessary to provide content sharing decisions regarding the user. The data may be anonymized and/or encrypted while in use, and the data may only be maintained as needed for providing the services that the user approves. If the user chooses to opt out of the system, any user information previously collected may be permanently deleted.

Thus, illustrative embodiments provide one or more technical solutions that overcome a technical problem with providing security of confidential content contained within shared information during a web conferencing meeting. As a result, these one or more technical solutions provide a technical effect and practical application in the field of web conferencing and data security.

With reference now to FIG. 3, a diagram illustrating an example of a web conferencing meeting content visibility management system is depicted in accordance with an illustrative embodiment. Web conferencing meeting content visibility management system 300 may be implemented in a network of data processing systems, such as network data processing system 100 in FIG. 1. Web conferencing meeting content visibility management system 300 is a system of hardware and software components for dynamic masking of confidential content contained within shared information during a web conferencing meeting depending on who is presenting the shared information and who is viewing the shared information using content visibility control settings and adaptive learning.

In this example, web conferencing meeting content visibility management system 300 includes web conferencing meeting server 302, client device 304, and client device 306. However, it should be noted that web conferencing meeting content visibility management system 300 is intended as an example only and not as a limitation on illustrative embodiments. In other words, web conferencing meeting content visibility management system 300 may include any number of web conferencing meeting servers, client devices, and other devices and components not shown.

Web conferencing meeting server 302 may be, for example, server 104 in FIG. 1 or data processing system 200 in FIG. 2. Client device 304 and client device 306 may be, for example, client 110 and client 112 in FIG. 1. Client device 304 corresponds to content presenter 308. Content presenter 308 may be, for example, an organizer of web conferencing meeting 334 and is a person who is sharing information with other participants such as participant 310 of web conferencing meeting 334. Client device 306 corresponds to participant 310. Participant 310 is a person who is viewing the information shared by content presenter 308. However, it should be noted that the shared information may contain confidential content or other information specified by content presenter 308 that content presenter 308 does not want participant 310 to view.

In this example, web conferencing meeting server 302 includes knowledgebase 312 and content visibility manager 314. Knowledgebase 312 contains learned data and user feedback 316. Learned data may be, for example, content visibility control settings for previously hosted web conferencing meetings, contexts of the meetings, identification of content presenters and participants of the meetings, details (e.g., profiles) corresponding to the content presenters and participants, identification of client devices corresponding to the content presenters and participants, and the like. User feedback is any information provided by the content presenters and participants regarding their experiences during the meetings.

Content visibility manager 314 may be, for example, web conferencing meeting content visibility manager 218 in FIG. 2. Content visibility manager 314 utilizes learned data and user feedback 316 for adaptive learning to control visibility of confidential content during web conferencing meeting 334. In this example, content visibility manager 314 includes sharing protocols 318, registered users details 320, and network protocols 322. Sharing protocols 318 include authentication 324 to authenticate users and encryption 326 to encrypt shared information between client devices. Registered users details 320 provide details regarding content presenter 308 and participant 310 and include content visibility permissions 328. Content visibility permissions 328 specify what permissions or authorizations that content presenter 308 and participant 310 have to view content. Network protocols 322 define what network protocols to use for web conferencing meeting 334 and include audio-video streaming component 330. Audio-video streaming component 330 provides audio-video stream 332 of web conferencing meeting 334 between client device 304 of content presenter 308 and client device 306 of participant 310.

Client device 304 includes web conferencing meeting application 336, which content presenter 308 uses during web conferencing meeting 334. In this example, web conferencing meeting application 336 includes sharing mode 338 and content visibility control settings 340. Sharing mode 338 includes screen sharing 342 and control sharing 344. Screen sharing 342 enables participant 310 to view information displayed on a screen of client device 304. Control sharing 344 enables participant 310 to control what information is displayed on the screen of client device 304. Content visibility control settings 340 control visibility of confidential content, which may be contained in information during screen sharing 342 or control sharing 344, by participant 310. Content visibility control settings 340 include content presenter-defined/predefined content visibility control settings 346 and system-generated content visibility control settings 348.

Web conferencing meeting application 336 sends content visibility control signal 350 to web conferencing application 352 of client device 306 via web conferencing meeting server 302 based on content visibility control settings 340. Web conferencing application 352 includes view/control modes 354 and viewing privileges 356. View/control modes 354 include view content present's screen 358 and control content presenters screen 360. Viewing privileges 356 include view content as per content presenter-defined settings 362 and request for additional content visibility 364. At 366, participant 310 requests additional content visibility during web conferencing meeting 334 to view content that was masked or concealed as per content presenter-defined settings 362.

Figure 4:
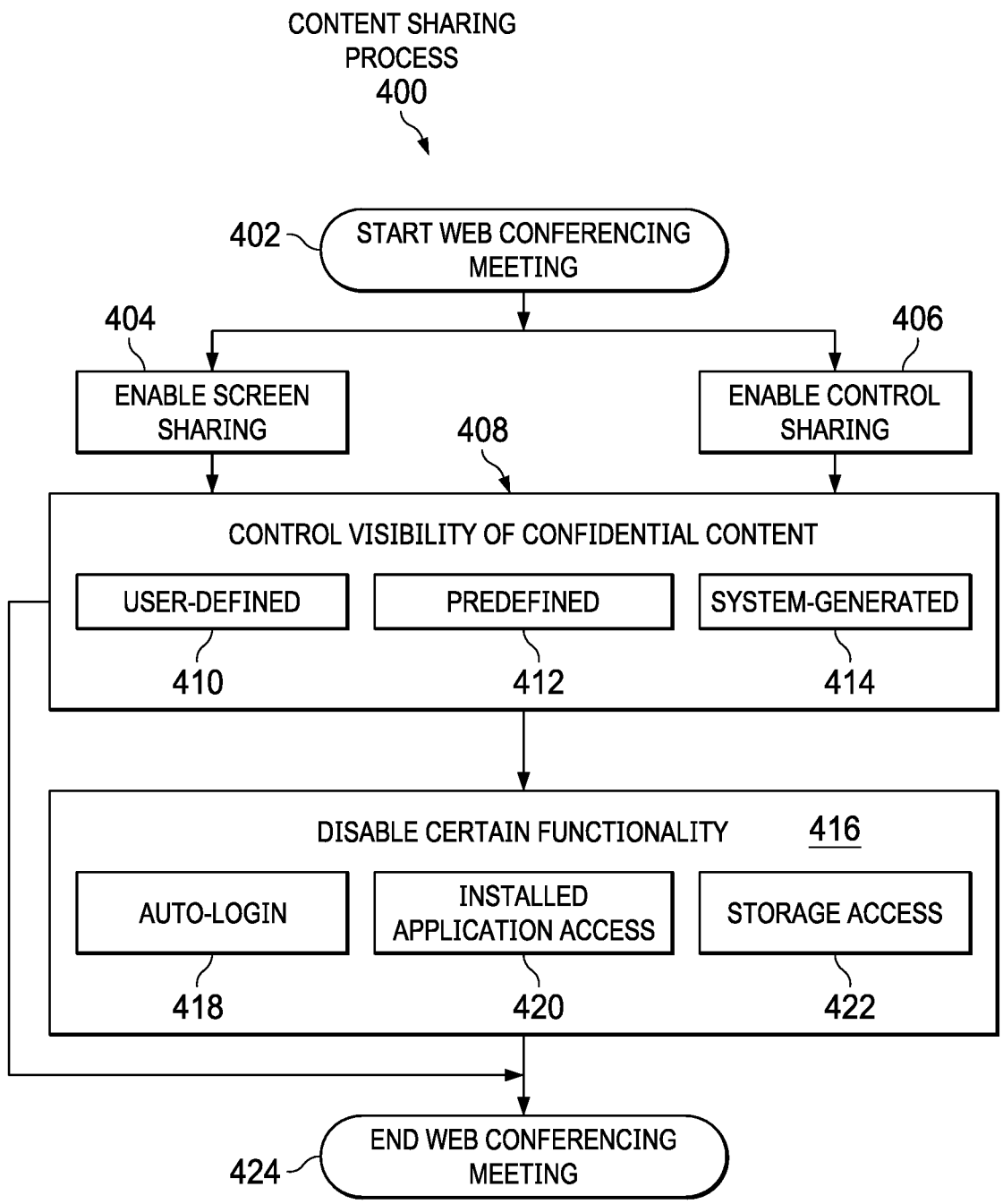
FIG. 4 is a diagram illustrating an example of a content sharing process in accordance with an illustrative embodiment.

With reference now to FIG. 4, a diagram illustrating an example of a content sharing process is depicted in accordance with an illustrative embodiment. Content sharing process 400 may be implemented in a computer, such as, for example, server 104 in FIG. 1, data processing system 200 in FIG. 2, or web conferencing meeting server 302 in FIG. 3. For example, content sharing process 400 may be implemented in web conferencing meeting content visibility manager 218 in FIG. 2 or content visibility manager 314 in FIG. 3.

At 402, the computer starts a web conferencing meeting between at least one content presenter, such as content presenter 308 in FIG. 3, and at least one participant (e.g., content viewer), such as participant 310 in FIG. 3. It should be noted that a participant can become a content presenter during the web conferencing meeting. At 404, the computer enables screen sharing in the web conferencing meeting. Screen sharing enables participants to view shared information displayed on a screen of a client device that the content presenter is using for the web conferencing meeting. At 406, the computer also enables control sharing in the web conferencing meeting. Control sharing enables participants to control what shared information is displayed on the screen of the client device corresponding to the content presenter.

At 408, the computer controls visibility of confidential content contained in the shared information by the content presenter. The computer controls the visibility of the confidential content utilizing user-defined (e.g., content presenter-defined) content visibility restriction settings 410, predefined content visibility control settings 412, and system-generated (e.g., computer-generated) content visibility control settings 414. User-defined content visibility restriction settings 410 specify what information the content presenter considers confidential and is not to be visible to all or a specified set of the participants during the web conferencing meeting. Predefined content visibility control settings 412 represent default rules, such as, for example, personally identifiable information, personal medical information, or the like is never to be shared. System-generated content visibility control settings 414 represent a set of content visibility rules that the computer generates prior to and during the web conferencing meeting based on a plurality of factors or dimensions, such as type and number of participants, purpose of the meeting (e.g., agenda), dynamics of the meeting, electronic calendar entries, current projects, and the like.

Further, at 416, the computer disables a specified set of functionalities of the client device corresponding to the content presenter. In this example, the computer disables auto-login 418, installed application access 420, and storage access 422 of the client device corresponding to the content presenter so that participants cannot utilize or access these features or components during control sharing in the web conferencing meeting. However, it should be noted that the computer can disable any user-specified set of features or components of the client device corresponding to the content presenter. At 424, the computer ends the web conferencing meeting.

Figure 5A:
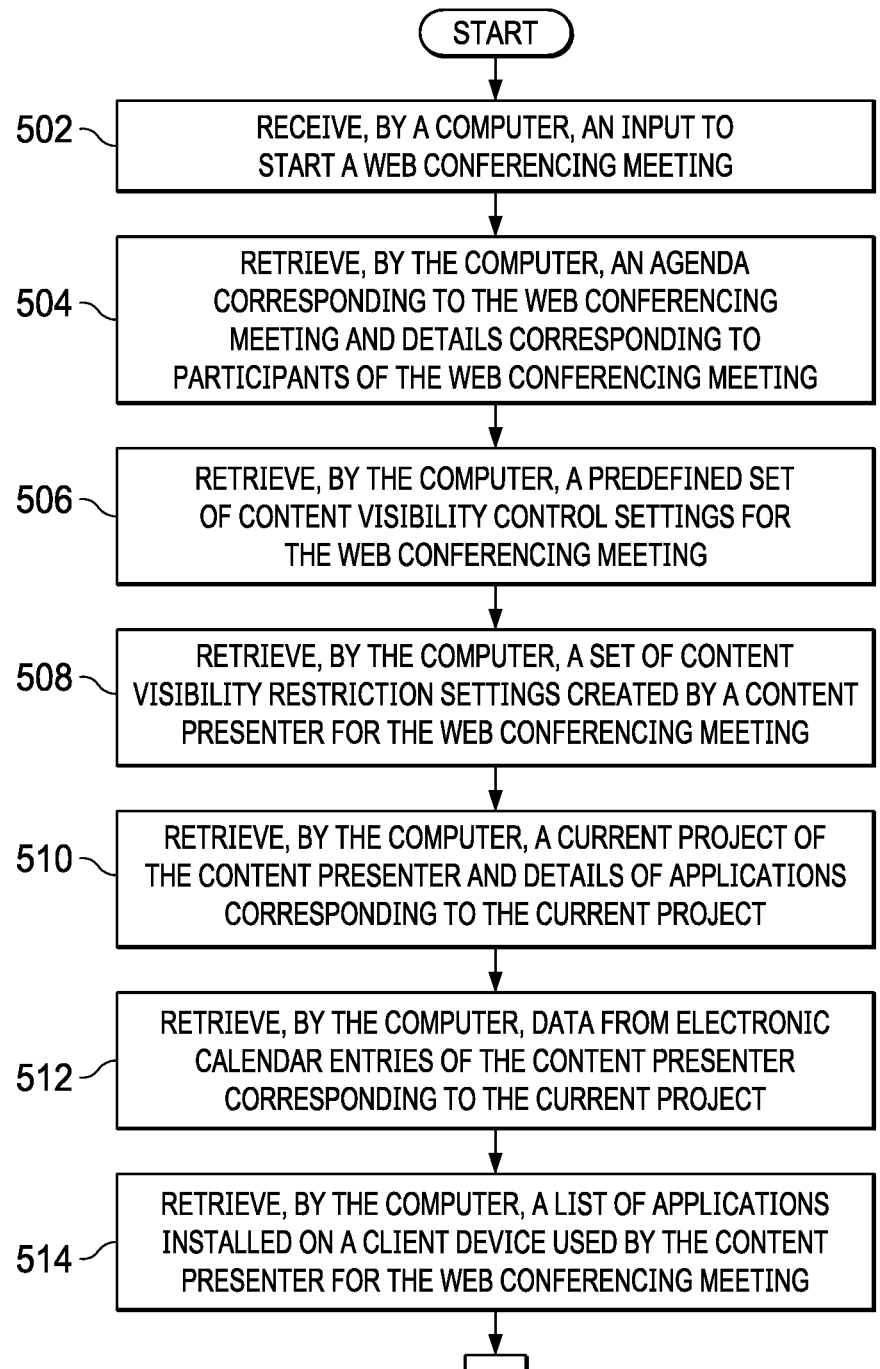
Figure 5C:
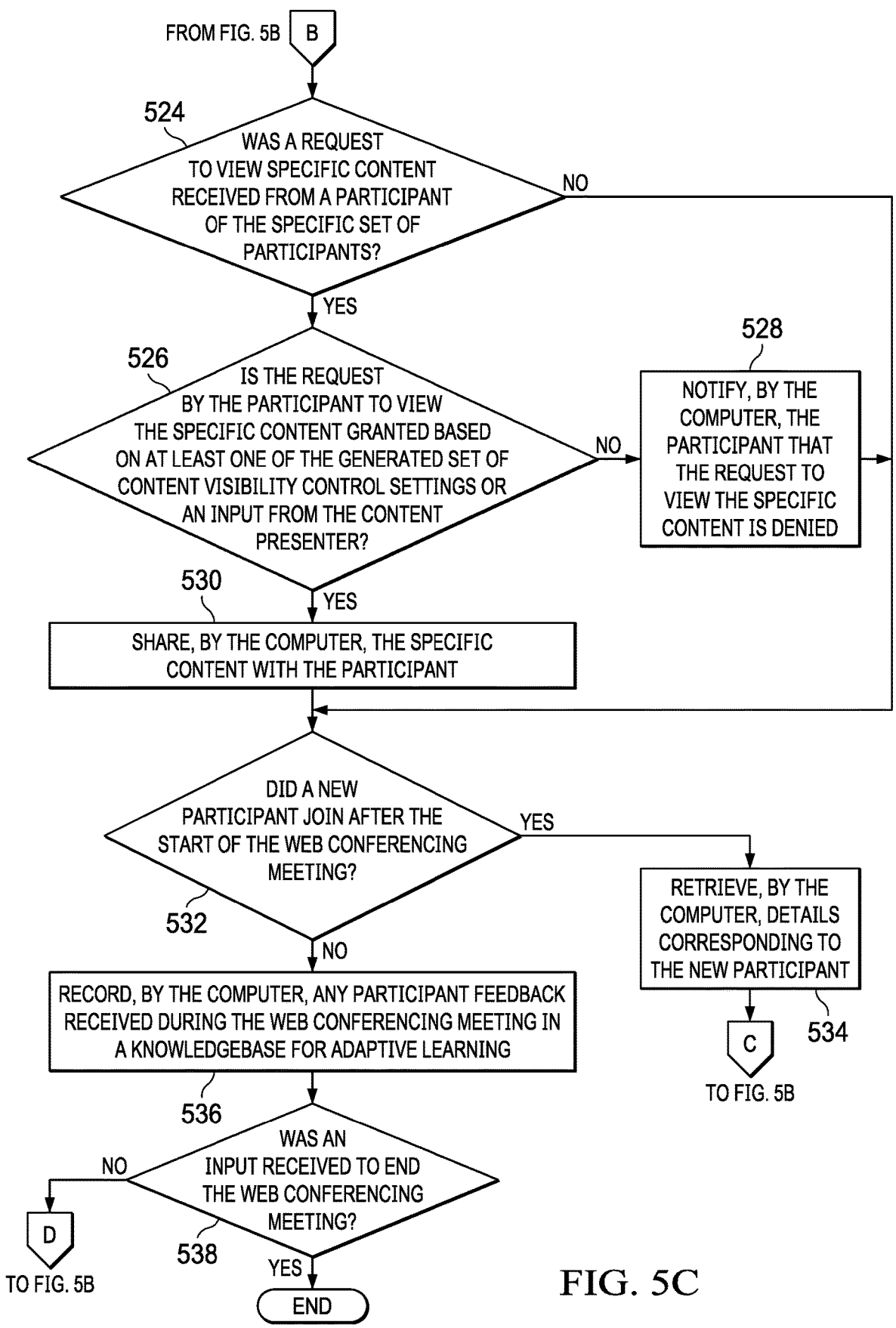

With reference now to FIGS. 5A-5C, a flowchart illustrating a process for adaptive masking of confidential content contained within shared information during a web conferencing meeting is shown in accordance with an illustrative embodiment. The process shown in FIGS. 5A-5C may be implemented in a computer, such as, for example, server 104 in FIG. 1, data processing system 200 in FIG. 2, or web conferencing meeting server 302 in FIG. 3. For example, the process shown in FIGS. 5A-5C may be implemented in web conferencing meeting content visibility manager 218 in FIG. 2 or content visibility manager 314 in FIG. 3.

The process begins when the computer receives an input to start a web conferencing meeting (step 502). In response to starting the web conferencing meeting, the computer retrieves an agenda corresponding to the web conferencing meeting and details corresponding to participants of the web conferencing meeting (step 504). Participant details may include, for example, number of participants, roles of participants, security levels of participants, content visibility permissions of participants, team memberships of participants, team preferences, current projects of participants, client devices of participants, and the like. The computer also retrieves a predefined set of content visibility control settings for the web conferencing meeting (step 506). In addition, the computer retrieves a set of content visibility restriction settings created by a content presenter for the web conferencing meeting (step 508). Further, the computer retrieves a current project of the content presenter and details of applications corresponding to the current project (step 510). Furthermore, the computer retrieves data from electronic calendar entries of the content presenter corresponding to the current project (step 512). Moreover, the computer retrieves a list of applications installed on a client device used by the content presenter for the web conferencing meeting (step 514).

Afterward, the computer generates a set of content visibility control settings for the web conferencing meeting based on at least one of the agenda corresponding to the web conferencing meeting, the details corresponding to the participants of the web conferencing meeting, the predefined set of content visibility control settings, the set of content visibility restriction settings created by the content presenter for the web conferencing meeting, the current project of the content presenter, the details of the applications corresponding to the current project, the data from the electronic calendar entries of the content presenter corresponding to the current project, or the list of applications installed on the client device of the content presenter (step 516). The computer also selects which portions of a screen of the client device corresponding to the content presenter are invisible to the participants during the web conferencing meeting using the generated set of content visibility control settings for the web conferencing meeting (step 518). Portions of the screen may include, for example, system tray, browser tabs, specific presentation slides, specific PDFs, specific spreadsheets, and the like. In addition, the computer selects which pop-up notifications on the screen of the client device corresponding to the content presenter are invisible to the participants during the web conferencing meeting using the generated set of content visibility control settings for the web conferencing meeting (step 520). The pop-up notifications may include, for example, communicator notifications, email notifications, operating system notifications, reminder notifications, and the like.

The computer controls visibility of confidential content included in shared information to the participants dynamically by masking the confidential content with a content masking shape to conceal the confidential content from only a specific set of participants during the web conferencing meeting using the generated set of content visibility control settings for the web conferencing meeting, while a remaining set of participants can still view the confidential content during the web conferencing meeting (step 522). The computer makes a determination as to whether a request to view specific content was received from a participant of the specific set of participants not able to view the confidential content (step 524). If the computer determines that no request to view specific content was received from a participant of the specific set of participants not able to view the confidential content, no output of step 524, then the process proceeds to step 532. If the computer determines that a request to view specific content was received from a participant of the specific set of participants not able to view the confidential content, yes output of step 524, then the computer makes a determination as to whether the request by the participant to view the specific content is granted based on at least one of the generated content visibility control settings or an input from the content presenter (step 526).

If the computer determines that the request by the participant to view the specific content is not granted based on at least one of the generated content visibility control settings or an input from the content presenter, no output of step 526, then the computer notifies the participant that the request to view the specific content is denied (step 528). Thereafter, the process proceeds to step 532. If the computer determines that the request by the participant to view the specific content is granted based on at least one of the generated content visibility control settings or an input from the content presenter, yes output of step 526, then the computer shares the specific content with the participant (step 530).

Further, the computer makes a determination as to whether a new participant joined after the start of the web conferencing meeting (step 532). If the computer determines that a new participant did join after the start of the web conferencing meeting, yes output of step 532, then the computer retrieves details corresponding to the new participant (step 534). Thereafter, the process returns to step 516 where the computer generates a new set of content visibility settings for the web conferencing meeting using the details corresponding to the new participant and the previously retrieved information. If the computer determines that no new participant joined after the start of the web conferencing meeting, no output of step 532, then the computer records any participant feedback received during the web conferencing meeting in a knowledgebase for adaptive learning (step 536).

Furthermore, the computer makes a determination as to whether an input was received to end the web conferencing meeting (step 538). If the computer determines that no input was received to end the web conferencing meeting, no output of step 538, then the process returns to step 522 where the computer continues to control visibility of confidential content included in the shared information. If the computer determines that an input was received to end the web conferencing meeting, yes output of step 538, then the process terminates thereafter.

Figure 6:
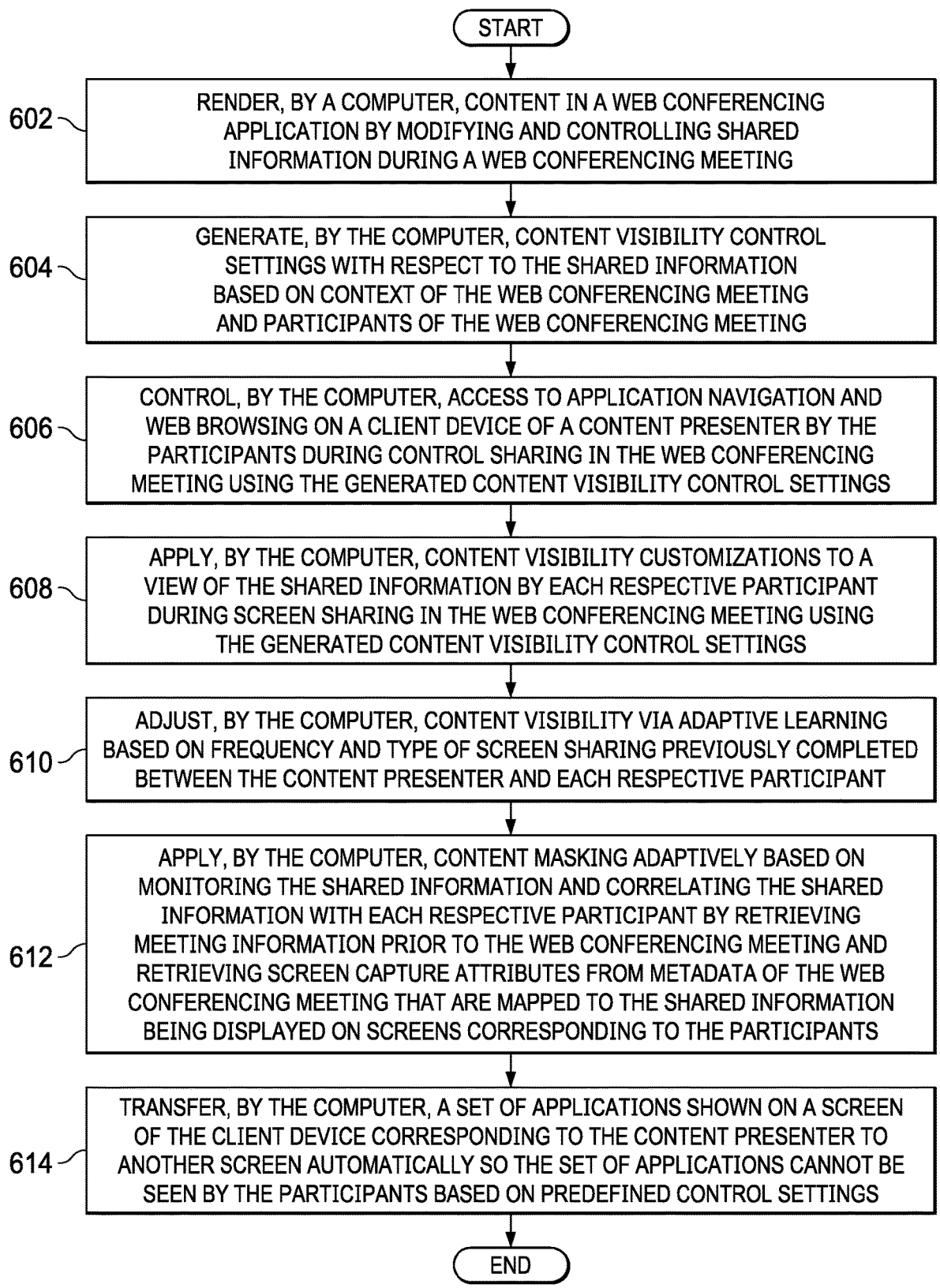
FIG. 6 is a flowchart illustrating a process for adaptive content masking in accordance with an illustrative embodiment.

With reference now to FIG. 6, a flowchart illustrating a process for adaptive content masking is shown in accordance with an illustrative embodiment. The process shown in FIG. 6 may be implemented in a computer, such as, for example, server 104 in FIG. 1, data processing system 200 in FIG. 2, or web conferencing meeting server 302 in FIG. 3. For example, the process shown in FIG. 6 may be implemented in web conferencing meeting content visibility manager 218 in FIG. 2 or content visibility manager 314 in FIG. 3.

The process begins when the computer renders content in a web conferencing application by modifying and controlling shared information during a web conferencing meeting (step 602). The computer generates content visibility control settings with respect to the shared information based on context of the web conferencing meeting and participants of the web conferencing meeting (step 604). The computer controls access to application navigation and web browsing on a client device of a content presenter by the participants during control sharing in the web conferencing meeting using the generated content visibility control settings (step 606). The computer also applies content visibility customizations to a view of the shared information by each respective participant during screen sharing in the web conferencing meeting using the generated content visibility control settings (step 608).

In addition, the computer adjusts content visibility via adaptive learning based on frequency and type of screen sharing previously completed between the content presenter and each respective participant (step 610). Further, the computer applies content masking adaptively based on monitoring the shared information and correlating the shared information with each respective participant by retrieving meeting information prior to the web conferencing meeting and retrieving screen capture attributes from metadata of the web conferencing meeting that are mapped to the shared information being displayed on screens corresponding to the participants (step 612). Furthermore, the computer transfers a set of applications shown on a screen of the client device corresponding to the content presenter to another screen automatically so the set of applications cannot be seen by the participants based on predefined control settings (step 614). Thereafter, the process terminates.

Thus, illustrative embodiments of the present invention provide a computer-implemented method, computer system, and computer program product for dynamic masking of confidential content contained within shared information over the course of an entire web conferencing meeting depending on who is presenting the shared information and who is viewing the shared information using content visibility control settings and adaptive learning. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, or to enable others of ordinary skill in the art to understand the embodiments disclosed herein.

What is claimed is:

1. A computer-implemented method for adaptive content masking, the computer-implemented method comprising:
   applying, by a computer, content visibility customizations to a view of shared information by respective participants during screen sharing in a web conferencing meeting using content visibility control settings, wherein the content visibility control settings comprise predefined content visibility control settings and system-generated content visibility control settings, wherein the predefined content visibility control setting are defined prior to starting a presentation, wherein the predefined content visibility control settings include one or more rules identifying information that is never to be shared in any presentation to any participants;
   adjusting, by the computer, content visibility via adaptive learning based on frequency and type of screen sharing in one or more prior web conference meetings previously completed between a content presenter and respective participants of the web conferencing meeting; and
   applying, by the computer, content masking adaptively based on the content visibility control settings and based on monitoring the shared information and correlating the shared information with respective participants by retrieving meeting information prior to the web conferencing meeting and retrieving screen capture attributes from metadata of the web conferencing meeting that are mapped to the shared information being displayed on screens corresponding to respective participants, wherein the content masking is applied dynamically in real time based on changes in roles of presenter and participants.

2. The computer-implemented method of claim 1 further comprising:
   rendering, by the computer, content in a web conferencing application by modifying and controlling the shared information during the web conferencing meeting;
   generating, by the computer, the system-generated content visibility control settings with respect to the shared information based on context of the web conferencing meeting and participants of the web conferencing meeting; and controlling, by the computer, access to application navigation and web browsing on a client device of the content presenter by the participants during control sharing in the web conferencing meeting using the content visibility control settings.

3. The computer-implemented method of claim 1 further comprising:

transferring, by the computer, a set of applications shown on a screen of a client device corresponding to the content presenter to another screen automatically so the set of applications cannot be seen by participants of the web conferencing meeting based on predefined content visibility control settings.

4. The computer-implemented method of claim 1 further comprising:

retrieving, by the computer, an agenda corresponding to the web conferencing meeting and details corresponding to participants of the web conferencing meeting;

retrieving, by the computer, the predefined content visibility control settings for the web conferencing meeting;

retrieving, by the computer, a set of content visibility restriction settings created by a content presenter for the web conferencing meeting;

retrieving, by the computer, a current project of the content presenter and details of applications corresponding to the current project;

retrieving, by the computer, data from electronic calendar entries of the content presenter corresponding to the current project; and retrieving, by the computer, a list of applications installed on a client device used by the content presenter for the web conferencing meeting.

5. The computer-implemented method of claim 4 further comprising:

generating, by the computer, the system-generated content visibility control settings for the web conferencing meeting based on at least one of the agenda corresponding to the web conferencing meeting, the details corresponding to the participants of the web conferencing meeting, the predefined content visibility control settings, the set of content visibility restriction settings created by the content presenter for the web conferencing meeting, the current project of the content presenter, the details of the applications corresponding to the current project, the data from the electronic calendar entries of the content presenter corresponding to the current project, or the list of applications installed on the client device of the content presenter.

6. The computer-implemented method of claim 5 further comprising:

selecting, by the computer, which portions of a screen of a client device corresponding to the content presenter are invisible to participants during the web conferencing meeting using the set of content visibility control settings for the web conferencing meeting; and selecting, by the computer, which pop-up notifications on the screen of the client device corresponding to the content presenter are invisible to the participants during the web conferencing meeting using the set of content visibility control settings for the web conferencing meeting.

7. The computer-implemented method of claim 1 further comprising:

controlling, by the computer, visibility of confidential content included in the shared information to participants of the web conferencing meeting by masking the confidential content with a content masking shape to conceal the confidential content from a specific set of participants during the web conferencing meeting using the system-generated content visibility control settings for the web conferencing meeting, while a remaining set of participants view the confidential content during the web conferencing meeting.

8. The computer-implemented method of claim 7 further comprising:

determining, by the computer, whether a request by a participant of the specific set of participants not able to view the confidential content to view specific content is granted based on at least one of the system-generated content visibility control settings or an input from the content presenter;

responsive to the computer determining that the request by the participant to view the specific content is not granted based on at least one of the system-generated content visibility control settings or the input from the content presenter, notifying, by the computer, the participant that the request to view the specific content is denied; and responsive to the computer determining that the request by the participant to view the specific content is granted based on at least one of the system-generated content visibility control settings or the input from the content presenter, sharing, by the computer, the specific content with the participant.

9. The computer-implemented method of claim 1 further comprising:

recording, by the computer, participant feedback received during the web conferencing meeting in a knowledge-base for adaptive learning.

10. The computer-implemented method of claim 1 further comprising:

disabling, by the computer, a set of functionalities of a client device corresponding to the content presenter so that participants of the web conferencing meeting cannot utilize the set of functionalities during control sharing in the web conferencing meeting.

11. The computer-implemented method of claim 1, wherein the computer utilizes a deep convolutional neural network to identify and capture confidential content shown on a screen of the content presenter at any given time during the web conferencing meeting.

12. A computer system for adaptive content masking, the computer system comprising:

a bus system;

a storage device connected to the bus system, wherein the storage device stores program instructions; and a processor connected to the bus system, wherein the processor executes the program instructions to:

apply content visibility customizations to a view of shared information by respective participants during screen sharing in a web conferencing meeting using content visibility control settings, wherein the content visibility control settings comprise predefined content visibility control settings and system-generated content visibility control settings, wherein the predefined content visibility control setting are defined prior to starting a presentation, wherein the predefined content visibility control settings include one or more rules identifying information that is never to be shared in any presentation to any participants;

adjust content visibility via adaptive learning based on frequency and type of screen sharing in one or more prior web conference meetings previously completed between a content presenter and respective participants of the web conferencing meeting; and apply content masking adaptively based on the content visibility control settings and based on monitoring the shared information and correlating the shared information with respective participants by retrieving meeting information prior to the web conferencing meeting and retrieving screen capture attributes from metadata of the web conferencing meeting that are mapped to the shared information being displayed on screens corresponding to respective participants, wherein the content masking is applied dynamically in real time based on changes in roles of presenter and participants.

13. The computer system of claim 12, wherein the processor further executes the program instructions to:

render content in a web conferencing application by modifying and controlling the shared information during the web conferencing meeting;

generate the system-generated content visibility control settings with respect to the shared information based on context of the web conferencing meeting and participants of the web conferencing meeting; and control access to application navigation and web browsing on a client device of the content presenter by the participants during control sharing in the web conferencing meeting using the content visibility control settings.

14. A computer program product for adaptive content masking, the computer program product comprising a computer-readable storage medium having program instructions embodied therewith, the program instructions executable by a computer to cause the computer to perform a method of:

applying, by the computer, content visibility customizations to a view of shared information by respective participants during screen sharing in a web conferencing meeting using content visibility control settings, wherein the content visibility control settings comprise predefined content visibility control settings and system-generated content visibility control settings, wherein the predefined content visibility control setting are defined prior to starting a presentation, wherein the predefined content visibility control settings include one or more rules identifying information that is never to be shared in any presentation to any participants;

adjusting, by the computer, content visibility via adaptive learning based on frequency and type of screen sharing in one or more prior web conference meetings previously completed between a content presenter and respective participants of the web conferencing meeting; and applying, by the computer, content masking adaptively based on the content visibility control settings and based on monitoring the shared information and correlating the shared information with respective participants by retrieving meeting information prior to the web conferencing meeting and retrieving screen capture attributes from metadata of the web conferencing meeting that are mapped to the shared information being displayed on screens corresponding to respective participants, wherein the content masking is applied dynamically in real time based on changes in roles of presenter and participants.

15. The computer program product of claim 14 further comprising:

rendering, by the computer, content in a web conferencing application by modifying and controlling the shared information during the web conferencing meeting;

generating, by the computer, the system-generated content visibility control settings with respect to the shared information based on context of the web conferencing meeting and participants of the web conferencing meeting; and controlling, by the computer, access to application navigation and web browsing on a client device of the content presenter by the participants during control sharing in the web conferencing meeting using the content visibility control settings.

16. The computer program product of claim 14 further comprising:

transferring, by the computer, a set of applications shown on a screen of a client device corresponding to the content presenter to another screen automatically so the set of applications cannot be seen by participants of the web conferencing meeting based on predefined content visibility control settings.

17. The computer program product of claim 14 further comprising:

retrieving, by the computer, an agenda corresponding to the web conferencing meeting and details corresponding to participants of the web conferencing meeting;

retrieving, by the computer, the predefined content visibility control settings for the web conferencing meeting;

retrieving, by the computer, a set of content visibility restriction settings created by a content presenter for the web conferencing meeting;

retrieving, by the computer, a current project of the content presenter and details of applications corresponding to the current project;

retrieving, by the computer, data from electronic calendar entries of the content presenter corresponding to the current project; and retrieving, by the computer, a list of applications installed on a client device used by the content presenter for the web conferencing meeting.

18. The computer program product of claim 17 further comprising:

generating, by the computer, the system-generated content visibility control settings for the web conferencing meeting based on at least one of the agenda corresponding to the web conferencing meeting, the details corresponding to the participants of the web conferencing meeting, the predefined content visibility control settings, the set of content visibility restriction settings created by the content presenter for the web conferencing meeting, the current project of the content presenter, the details of the applications corresponding to the current project, the data from the electronic calendar entries of the content presenter corresponding to the current project, or the list of applications installed on the client device of the content presenter.

19. The computer program product of claim 18 further comprising:

selecting, by the computer, which portions of a screen of a client device corresponding to the content presenter are invisible to participants during the web conferencing meeting using the set of content visibility control settings for the web conferencing meeting; and selecting, by the computer, which pop-up notifications on the screen of the client device corresponding to the content presenter are invisible to the participants during the web conferencing meeting using the set of content visibility control settings for the web conferencing meeting.

20. The computer program product of claim 14 further comprising:

controlling, by the computer, visibility of confidential content included in the shared information to participants of the web conferencing meeting by masking the confidential content with a content masking shape to conceal the confidential content from a specific set of participants during the web conferencing meeting using the system-generated content visibility control settings for the web conferencing meeting, while a remaining set of participants view the confidential content during the web conferencing meeting.

* * * * *